(12) United States Patent
Yamamoto

(10) Patent No.: US 7,020,058 B2
(45) Date of Patent: Mar. 28, 2006

(54) OPTICAL DISC DEVICE VARYING, DETECTING AND NOTICING A RECORDING VELOCITY DURING A RECORDING

(75) Inventor: Kazutaka Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 497 days.

(21) Appl. No.: 10/132,380

(22) Filed: Apr. 26, 2002

(65) Prior Publication Data

US 2003/0002414 A1 Jan. 2, 2003

(30) Foreign Application Priority Data

Jun. 29, 2001 (JP) ............... 2001-200228

(51) Int. Cl.
*G11B 7/00* (2006.01)
(52) U.S. Cl. ............... 369/47.38; 369/47.29; 369/47.43
(58) Field of Classification Search ............ 369/47.38, 369/47.32, 47.33, 47.39, 47.43, 47.45, 47.34, 369/47.27, 47.29, 47.36, 47.4, 47.1, 53.22
See application file for complete search history.

(56) References Cited

U.S. PATENT DOCUMENTS

| | | | |
|---|---|---|---|
| 5,463,604 A | 10/1995 | Naito | |
| 5,553,042 A | 9/1996 | Usui | |
| 6,115,342 A * | 9/2000 | Kazuno et al. | 369/59.26 |
| 6,154,428 A | 11/2000 | Lee | |
| 6,570,831 B1 * | 5/2003 | Choi | 369/47.28 |
| 6,714,509 B1 * | 3/2004 | Kumagai et al. | 369/275.4 |
| 6,728,177 B1 * | 4/2004 | Seong et al. | 369/47.4 |
| 6,751,174 B1 * | 6/2004 | Takahashi | 369/47.37 |
| 6,862,258 B1 * | 3/2005 | Kitagawa | 369/53.3 |
| 2001/0003519 A1 | 6/2001 | Tsukihashi | |

FOREIGN PATENT DOCUMENTS

| | | |
|---|---|---|
| EP | 0 872 837 A2 | 10/1998 |
| EP | 0 929 072 A2 | 7/1999 |
| EP | 1 081 696 A2 | 3/2001 |

* cited by examiner

*Primary Examiner*—Nabil Hindi
(74) *Attorney, Agent, or Firm*—Dickstein Shapiro Morin & Oshinsky LLP

(57) ABSTRACT

An optical disc device records data on an optical disc by projecting a laser beam on the optical disc such that a linear density of the data becomes substantially constant. The optical disc device comprises velocity judging means, velocity changing means, recording velocity detecting means, and recording velocity transmitting means. The velocity judging means is for judging a recordable velocity for an optical recording medium inserted into the optical disc device. The velocity changing means is for changing a recording velocity designated from a host. The recording velocity detecting means is for detecting the recording velocity during a recording. The recording velocity transmitting means is for transmitting information concerning the detected recording velocity to the host.

9 Claims, 4 Drawing Sheets

FIG.4

| Bit\Byte | 7 | 6 | 5 | 4 | 3 | 2 | 1 | 0 |
|---|---|---|---|---|---|---|---|---|
| 0 | PS | Reserved | | | Page Code (2Ah) | | | |
| 1 | Page Length (14h) | | | | | | | |
| 2 | Reserved | | | | | Method 2 | CD-RW Rd | CD-R Rd |
| 3 | Reserved | | | | | TW supported | CD-RW Wr | CD-R Wr |
| 4 | Reserved | Multi Session | Mode 2 Form 2 | Mode 2 Form 1 | Digital Port (2) | Digital Port (1) | Composite | AudioPlay |
| 5 | Bar Code Capability | UPC | ISRC | C2 Pointers | R-W De-interleaved & corrected | R-W Supported | DAAccu | CD DA |
| 6 | Loading Mechanism Type | | | Reserved | Eject | Prevent Jumper | Lock State | Lock |
| 7 | Reserved | | R-W in Lead-in Readable | Reserved | S/W Slot Selection (SSS) | Supports Disc Present (SDP) | Separate Channel Mute | Separate volume |
| 8 | (MSB) | | | | | | | |
| 9 | Maximum Speed Supported (in KBps) | | | | | | | (LSB) |
| 10 | (MSB) | | | | | | | |
| 11 | Number of Volume Levels Supported | | | | | | | (LSB) |
| 12 | (MSB) | | | | | | | |
| 13 | Buffer Size supported by Drive (in KBytes) | | | | | | | (LSB) |
| 14 | (MSB) | | | | | | | |
| 15 | Current Speed Supported (in KBps) | | | | | | | (LSB) |
| 16 | Reserved | | | | | | | |
| 17 | Reserved | | | Length = 01b | LSBF = 0 | RCK = 0 | BCK = 0 | Reserved |
| 18 | (MSB) | | | | | | | |
| 19 | Maximum Write Speed Supported (in KBps) | | | | | | | (LSB) |
| 20 | (MSB) | | | | | | | |
| 21 | Current Write Speed Selected (in KBps) | | | | | | | (LSB) |

OPTICAL DISC DEVICE VARYING, DETECTING AND NOTICING A RECORDING VELOCITY DURING A RECORDING

BACKGROUND OF THE INVENTION

1. Field of the Invention

The present invention generally relates to an optical disc device, and more particularly, to a technology for a host to obtain in real time a current recording velocity of an optical disc device varying the recording velocity during a recording to an optical disc, chiefly a CD-R or a CD-RW.

2. Description of the Related Art

In general, optical recording media can be classified into the following three types, depending on whether or not data can be recorded thereon repeatedly: a ROM type used only for reproduction, a write-once-read-many WORM type, and a rewritable type on which data can be recorded repeatedly. The ROM-type optical recording media include a CD-ROM (Compact Disc-Read Only Memory) and a DVD-ROM (Digital Versatile Disc-Read Only Memory). The WORM-type optical recording media include a write-once CD-R (Compact Disc-Recordable) and a write-once DVD-R (Digital Versatile Disc-Recordable). The rewritable-type optical recording media, on which data can be recorded freely and repeatedly, include a CD-RW (Compact Disc-Rewritable), a DVD-RAM (Digital Versatile Disc-Random Access Memory) and a DVD-RW (Digital Versatile Disc-Rewritable).

A driver device that records information on a medium having tracks in a spiral form, represented by the above-mentioned CD-R/RW, generally adopts a Constant Linear Velocity (CLV) method. However, since a conventional device records only at a slow recording velocity, there has not been a problem that a mechanical characteristic of a medium inhibits a maximum-velocity recording. Accordingly, a recording is always performed at a velocity designated from a host, and the host can inform an operator of the designated velocity as a recording velocity. In other words, the drive device does not have to return current recording velocity information to the host during a recording.

Recently, however, a recording velocity of the above-mentioned CD-R/CD-RW drive device has rapidly been developed higher. The recording velocity is now beginning to undergo an evolution similar to an evolution of a reproducing velocity in which the reproducing velocity is increased from a limit of revolutions in a 16-fold velocity CLV reproduction to a greater degree by a PCAV (Partial Constant Angular Velocity) reproduction and a CAV (Constant Angular Velocity) reproduction, without increasing the revolutions. For example, in a recording at a 20-fold velocity at a maximum, a ZCLV (Zone Constant Linear Velocity) recording is conceivable in which data is recorded by a 16-fold velocity CLV unto a 10-minute position, and by a 20-fold velocity CLV from the 10-minute position. Also, a PCAV (Partial Constant Angular Velocity) recording is conceivable in which data is recorded by a CAV from a 16-fold velocity to a 20-fold velocity, and once the velocity reaches the 20-fold velocity, data is recorded therefrom by a 20-fold velocity CLV.

In addition, as basic recording modes for the CD-R/CD-RW, there are a disc-at-once mode and a track-at-once mode. These modes are sequential writings which do not cause an interruption of recording unless a buffer underrun occurs. Accordingly, a time required for a recording can be easily conjectured from a recording velocity and a recording capacity. A host can inform an operator of the recording velocity and the time required for the recording so that the operator can perform systematic operations. This is a feature that a storage device performing a random writing does not possess.

Besides, a motor has a limit of revolutions partly because a focus and track servo cannot be performed correctly at a high-speed revolution. This depends greatly on a formation precision of media such that the servo cannot possibly be performed correctly even at a 16-fold velocity for an inferior medium.

Whereas a high-speed recording is realized by improvements in performance of both a drive and media, a safe recording is preferable with whatever media. This highlights an importance of a technology in which a drive device perceives a limit of media so as to record data at a safe velocity, the technology being put to practical use. For example, a maximum recording velocity is restricted according as types of media; or servo status is checked before writing so as to determine a safe velocity.

As mentioned above, conventionally, a drive device records data from the start to the end at a velocity designated by a host, which did not cause a particular problem. However, now that a recording velocity is increased variably, there occurs a difference between a velocity designated by a host and a velocity at which a drive device actually records data, which makes it difficult for an operator to conjecture a time required for a recording.

SUMMARY OF THE INVENTION

It is a general object of the present invention to provide an improved and useful optical disc device in which the above-mentioned problems are eliminated.

A more specific object of the present invention is to provide an optical disc device which enables a host to obtain recording velocity information at any time during a recording.

In order to achieve the above-mentioned objects, there is provided according to one aspect of the present invention an optical disc device recording data on an optical disc by projecting a laser beam on the optical disc such that a linear density of the data becomes substantially constant, the device comprising:

one of first recording means and second recording means for recording the data, the first recording means varying a recording velocity gradually, and the second recording means changing a recording velocity according as recording areas on the optical disc;

recording velocity detecting means for detecting the recording velocity during a recording performed by one of the first recording means and the second recording means; and recording velocity transmitting means for transmitting information concerning the recording velocity to a host, the recording velocity being detected by the recording velocity detecting means.

According to the present invention, a recording velocity during a recording is detected, and the recording velocity information is transmitted to the host so that the host can recognize the current recording velocity. Additionally, since a current recording velocity during a recording is imparted to the host, an operator can comprehend the recording velocity at any time, even when the recording velocity varies during the recording, so as to estimate a finish time of the recording, eliminating uneasiness and irritation.

In order to achieve the above-mentioned objects, there is also provided according to another aspect of the present invention an optical disc device recording data on an optical disc by projecting a laser beam on the optical disc such that a linear density of the data becomes substantially constant, the device comprising:

velocity judging means for judging a recordable velocity for an optical recording medium inserted into the optical disc device;

velocity changing means for changing a recording velocity designated from a host;

recording velocity detecting means for detecting the recording velocity during a recording; and recording velocity transmitting means for transmitting information concerning the recording velocity to the host, the recording velocity being detected by the recording velocity detecting means.

According to the present invention, even when the recording velocity is determined according as conditions of media, an operator can comprehend the recording velocity at any time so as to estimate a finish time of the recording, eliminating uneasiness and irritation.

Additionally, in the optical disc device according to the present invention, the velocity changing means may change the recording velocity designated from the host to the recordable velocity judged by the velocity judging means when the recording velocity is equal to or higher than the recordable velocity.

According to the present invention, since the recording velocity designated from the host is compared to the recordable velocity for an optical recording medium, data can always be recorded on the optical recording medium at the recordable velocity therefor.

Additionally, in the optical disc device according to the present invention, the recording velocity detecting means may comprise:

synchronizing signal counting means for counting ATIP synchronizing signals included in a wobble signal, where the ATIP synchronizing signals represent absolute time information; and recording velocity calculating means for calculating the recording velocity from a number of the ATIP synchronizing signals counted within a predetermined time.

According to the present invention, the ATIP synchronizing signals are counted so as to detect a recording velocity with ease, especially during a CAV recording in which the recording velocity is varied gradually.

Additionally, in the optical disc device according to the present invention, the recording velocity detecting means may comprise:

buffer pointer monitoring means for monitoring a buffer pointer used for transmitting record data; and recording velocity computing means for computing the recording velocity from a value of the buffer pointer varied within a predetermined time.

According to the present invention, the pointer of a buffer manager transmitting data to an encoder is used in measuring a recording velocity so as to minimize a CPU load.

Additionally, in the optical disc device according to the present invention, the recording velocity transmitting means may transmit the information concerning the recording velocity to the host by using a mode sense command allowed to be issued during a recording.

According to the present invention, since a standard command is used, a modification for realizing the recording velocity transmitting means can be made with minimum labor and a minimum amount of program code.

Other objects, features and advantages of the present invention will become more apparent from the following detailed description when read in conjunction with the accompanying drawings.

BRIEF DESCRIPTION OF THE DRAWINGS

FIG. 4 is a diagram representing mode sense data on Mode Page 2Ah according to the present invention.

DETAILED DESCRIPTION OF THE PREFERRED EMBODIMENTS

A description will now be given of embodiments according to the present invention.

Figure 1:
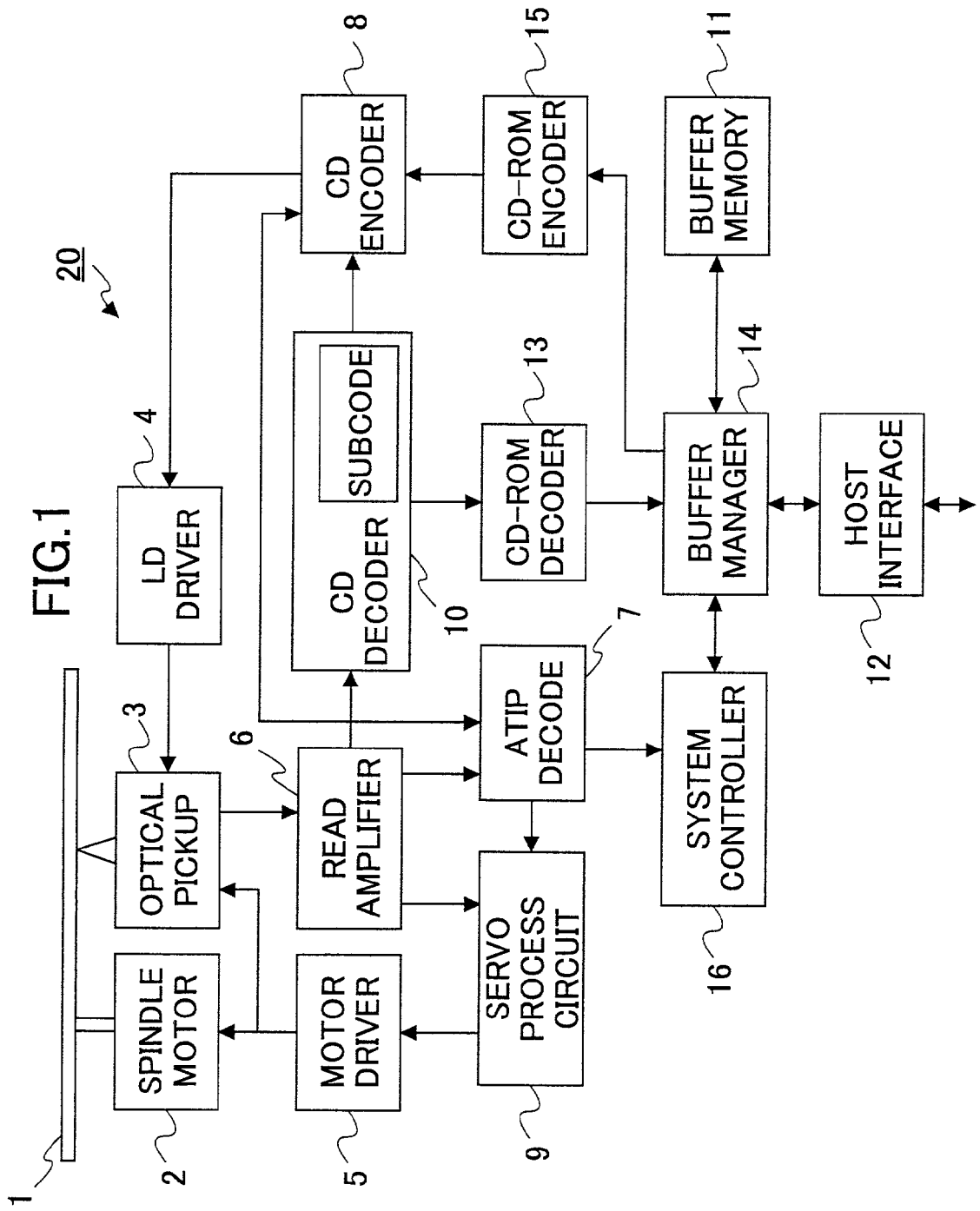
FIG. 1 is a block diagram showing a configuration of an optical disc drive device according to an embodiment of the present invention.

FIG. 1 is a block diagram showing a configuration of an optical disc drive device 20 according to an embodiment of the present invention. The optical disc drive device 20 comprises an optical disc 1, a spindle motor 2, an optical pickup 3, an LD driver 4, a motor driver 5, a read amplifier 6, an ATIP decoder 7, a CD encoder 8, a servo process circuit 9, a CD decoder 10, a buffer memory 11, a host interface 12, a CD-ROM decoder 13, a buffer manager 14, a CD-ROM encoder 15, and a system controller 16. The optical disc 1 is a CD revolved by the spindle motor 2. The motor driver 5 drives actuators (not shown in the figure) provided in the optical pickup 3. The servo process circuit 9 generates a signal used for a servo control, and supplies the signal to the motor driver 5. The read amplifier 6 processes each of signals supplied from a photo-receptive element (not shown in the figure) provided in the optical pickup 3. The optical pickup 3 incorporates a semiconductor laser light source for use in a CD, an optical system such as an objective lens, and the actuators, which are not shown in the figure. The LD driver 4 controls a luminous energy, etc. of the laser light source. The ATIP decoder 7 extracts ATIP (Absolute Time In Pregroove) information engraved in the optical disc 1. The CD encoder 8 generates information concerning an accurate start position of writing data. The CD decoder 10 subjects a binarized RF signal to an EFM (Eight to Fourteen) modulation. The buffer memory 11 temporarily stores data. The buffer manager 14 controls the buffer memory 11. The host interface 12 is connected to the buffer memory 11, and includes interfaces such as an ATAPI and an SCSI. The CD-ROM decoder 13 performs an error correction again with respect to data supplied from the CD decoder 10. The CD-ROM encoder 15 adds error correction code and performs an interleave. The system controller 16 controls the above-described system as a whole.

Besides, the optical pickup 3, the read amplifier 6, the ATIP decoder 7 and the system controller 16 mainly compose recording velocity detecting means and buffer pointer monitoring means. The buffer memory 11, the buffer manager 14 and the host interface 12 compose recording velocity transmitting means. The buffer memory 11, the buffer manager 14 and the system controller 16 mainly compose velocity judging means and velocity changing means. The ATIP decoder 7 and the system controller 16 mainly compose synchronizing signal counting means, recording velocity calculating means and recording velocity computing means.

Next, a description will be given of operations according to the embodiment of the present invention. In FIG. 1, arrows indicate representative streams of signals and data, and do not show all of connections among the above-described elements. The optical disc 1 is revolved by the spindle motor 2. The spindle motor 2 is controlled by the motor driver 5 and the servo process circuit 9 such that a linear velocity or an angular velocity becomes constant. The linear velocity or the angular velocity can be varied by steps. The optical pickup 3 incorporates the semiconductor laser, the optical system, a focus actuator, a track actuator, the photo-receptive element, and a position sensor, which are not shown in FIG. 1. The optical pickup 3 projects a laser light on the optical disc 1 so as to record data thereon or read data therefrom. Additionally, the optical pickup 3 can be moved by a seek motor. The focus actuator, the track actuator and the seek motor are controlled by the motor driver 5 and the servo process circuit 9 according to signals supplied from the photo-receptive element and the position sensor such that a laser spot is located at a target position. Upon reading data, a reproduction signal obtained by the optical pickup 3 is amplified and binarized by the read amplifier 6, and thereafter is supplied to the CD decoder 10 where the signal is de-interleaved and is subjected to an error correction. Subsequently, this data is supplied to the CD-ROM decoder 13 to be subjected to an error correction again for the purpose of enhancing a reliability of the data. Thereafter, this data is temporarily stored in the buffer memory 11 under the control of the buffer manager 14. When the stored data is accumulated so as to form sector data, the sector data is transmitted to a host (not shown in the figure) at one time via the host interface 12. Upon writing data, data transmitted from the host via the host interface 12 is temporarily stored in the buffer memory 11 under the control of the buffer manager 14. When the stored data is accumulated in the buffer memory 11 to a certain amount, the data starts to be written. Prior to this, however, a laser spot must be located at a start position of writing the data. This position is obtained by a wobble signal engraved beforehand on the optical disc 1 by a track wobbling thereon. The wobble signal includes absolute time information called ATIP. This information can be extracted by the ATIP decoder 7. A synchronizing signal generated by the ATIP decoder 7 is supplied to the CD encoder 8 so as to enable the data to be written from the accurate start position. The data stored in the buffer memory 11 is subjected to a process of adding an error correction code and is interleaved in the CD-ROM encoder 15 and the CD encoder 8, and is output from the CD encoder 8 as a signal modulated into an EFM signal suited for recording. The modulated signal is recorded on the optical disc 1 by a laser beam controlled by the LD driver 4 and the optical pickup 3. The LD driver 4 continuously controls conditions of light emission so as to record/reproduce properly, such as by making the laser beam luminous at a write power according to the EFM signal suited for recording.

Figure 2A:
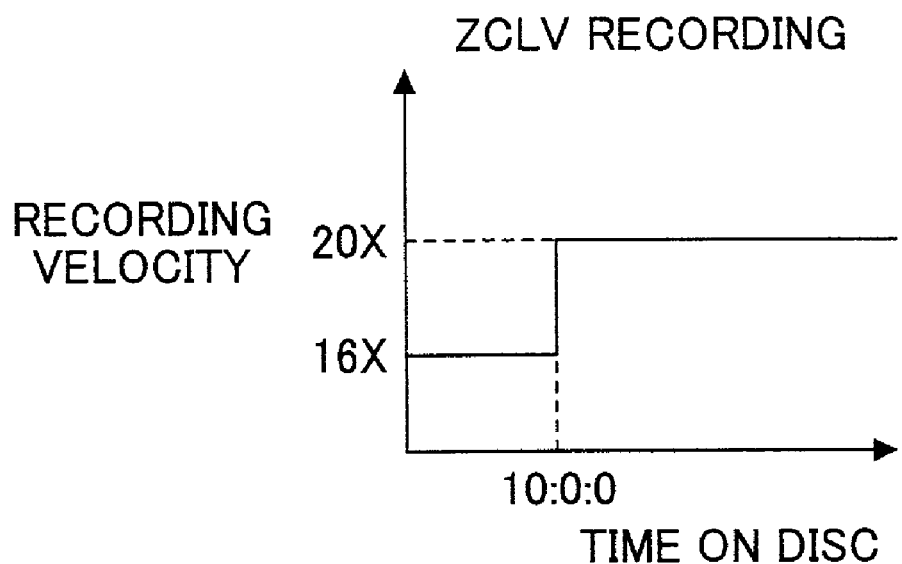
FIG. 2A is a graph representing a relationship between a time on disc and a recording velocity in a ZCLV recording.
Figure 2B:
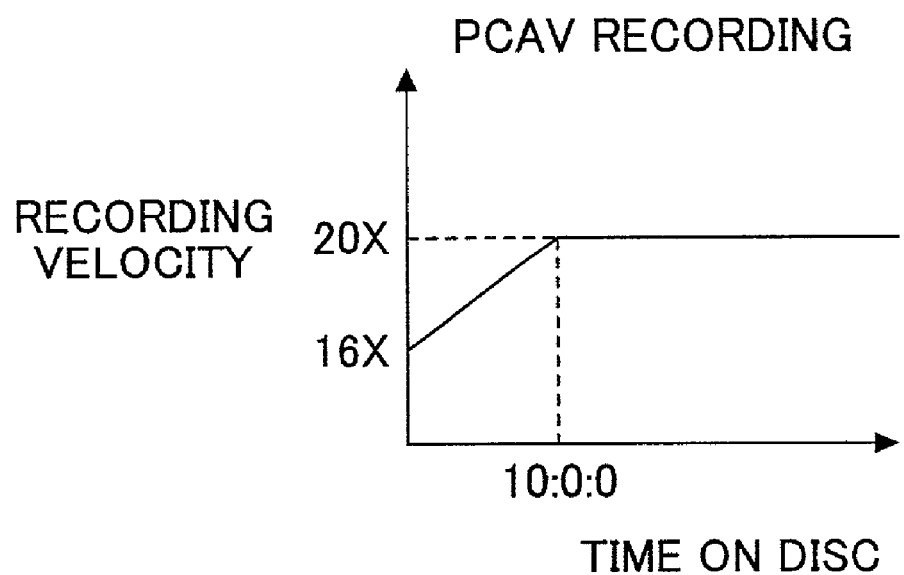
FIG. 2B is a graph representing a relationship between a time on disc and a recording velocity in a PCAV recording.

FIG. 2A is a graph representing a relationship between a time on disc and a recording velocity in a ZCLV recording. FIG. 2B is a graph representing a relationship between a time on disc and a recording velocity in a PCAV recording. It is noted that the PCAV recording mainly constitutes first recording means, and the ZCLV recording mainly constitutes second recording means. When a recording velocity for a CD-R becomes as fast as a 20-fold velocity, revolutions per minute at inner tracks exceed 10,000 rpm, which makes it difficult to control an optical pickup. Thereupon, for the purpose of restraining the revolutions per minute at inner tracks, data is recorded by a CAV, PCAV or ZCLV recording exhibiting different recording velocities at inner tracks and outer tracks. ZCLV, an abbreviation for Zone Constant Linear Velocity, is a recording method in which data is recorded at a constant recording velocity in each zone, the recording velocity becoming larger in outer zones. Although the ZCLV recording exhibits a lower average velocity than the PCAV recording, the ZCLV recording is supposed to exhibit an we excellent recording quality. For example, as shown in FIG. 2A, in a recording at a 20-fold velocity at a maximum, data is recorded by a 16-fold velocity CLV unto a 10-minute position, and by a 20-fold velocity CLV from the 10-minute position. PCAV, an abbreviation for Partial Constant Angular Velocity, is a recording method in which a recording velocity is gradually increased at inner tracks until the velocity reaches a maximum recording velocity, after which data is recorded at a constant recording velocity. For example, as shown in FIG. 2B, data is recorded by a CAV from a 16-fold velocity to a 20-fold velocity, and once the velocity reaches the 20-fold velocity, data is recorded therefrom by a 20-fold velocity CLV. When there is a large difference between recording velocities at inner tracks and outer tracks, the PCAV recording equals the CAV recording which includes no period during which data is recorded at a constant recording velocity.

When the recording velocity is not constant, an operator is anxious about at what velocity data is being recorded at present. Additionally, when data is recorded at a designated recording velocity throughout all tracks, a time required for the recording could be conjectured from an amount of the data to be recorded; however, when the recording velocity is not constant, it is difficult to conjecture the time required for the recording because the conjecturing requires a lot of information, such as a type of a recording method and a recording capacity for each recording velocity. However, knowing a current recording velocity relieves the operator, because the operator intuits the time required for the recording through an experiential leaning effect.

Additionally, in some cases, a high-speed recording cannot be performed to media standardized on a presumption of a low-speed recording. These cases occur due to problems in mechanical characteristics such as a side-runout and an eccentricity of the media, or due to problems in sensitivity of a recording film. Thereupon, in order to perform an unfailing and safe recording, the drive device is required to judge characteristics of the media so as to set a proper recording velocity. In this case, too, since data is recorded at a recording velocity different from a designated recording velocity, it is difficult to conjecture a time required for the recording, as when the recording velocity is not constant.

Figure 3:
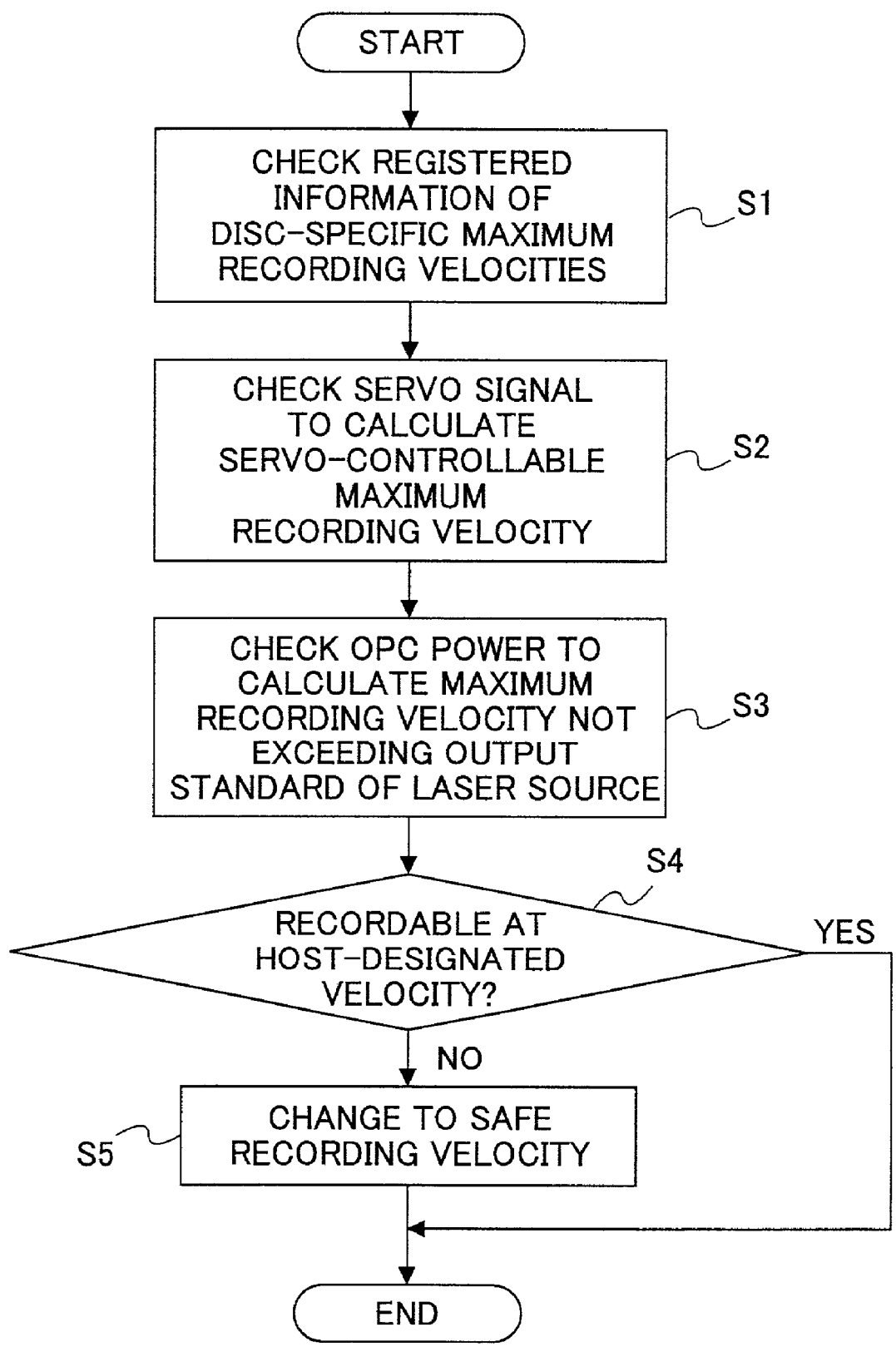
FIG. 3 is a flowchart for the drive device according to the embodiment of the present invention to change a recording velocity to a safe recording velocity.

FIG. 3 is a flowchart for the drive device according to the embodiment of the present invention to change a recording velocity to a safe recording velocity. First, information concerning maximum recording velocities registered beforehand with respect to principal types of discs is referred to (step S1). Next, a turbulence of a servo signal is measured at a plurality of positions in an area on which data is to be recorded. From the measurement is calculated a maximum recording velocity within which a light beam can be controlled correctly (step S2). Then, an OPC (Optimum Power Calibration) is performed so as to calculate a recording velocity with which data can be recorded with a write power not exceeding a maximum write power of the light beam (step S3). Subsequently, it is judged whether or not data can be recorded at a velocity designated from a host, i.e., whether or not the above-calculated velocities are higher than the velocity designated from the host (step S4). When the above-calculated velocities are lower than the velocity designated from the host (No in step S4), the velocity is changed to a lowest recording velocity considered to be safe (step S5). When the above-calculated velocities are higher than the velocity designated from the host (Yes in step S4), the data is recorded at the velocity designated from the host.

Besides, in the above-mentioned step S5, without means for noticing that the drive device has changed the recording velocity, the operator would feel very irritated that the recording is not finished after an expected time has elapsed. Thereupon, the drive device provides means for returning recording velocity information to the host during a recording. Specifically, the host issues a command requesting recording velocity information. The drive device detects a recording velocity at that time, and transmits the recording velocity information to the host. The host receives this recording velocity information, and updates a display of writer software. According to the above procedure, the operator can confirm the current recording velocity.

Additionally, one of methods for detecting a recording velocity during a recording is a method of counting ATIP synchronizing signals. The ATIP synchronizing signals may be counted by inputting the ATIP synchronizing signals into a hardware counter, or may be counted by a CPU using software upon interruptions of the ATIP synchronizing signals. Based on the number of the ATIP synchronizing signals per second, the recording velocity can be calculated according to an expression (1) in the following. In the expression (1), 2352 is the number of bytes per sector of a CD. 75 is a writing/reading velocity corresponding to a 1-fold velocity of a CD.

[Recording velocity]=(Count of *ATIP* synchronizing signals per second)×2352×75/1000 (KB/S)     (1)

Another method for detecting a recording velocity during a recording is a method of using a pointer of the buffer manager 14 transmitting data to the encoder. The above-described method of counting ATIP synchronizing signals has relative shortcomings that hardware resources become necessary, and that interruption for each sector increases a CPU load when the recording velocity is high. The pointer of the buffer manager 14 undergoes an increment upon transmitting one sector data to the encoder. The buffer is used in the form of a ring such that the pointer is returned from the ending point to the starting point. When the pointer makes one revolution or more, the number of recorded sectors becomes unknown; therefore, the pointer needs to be monitored in an interval shorter than the one revolution. The CPU load becomes several hundred times as little as in the above-described method of counting ATIP synchronizing signals. When the buffer has an enough capacity, the pointer may be read at an interval of one second so as to calculate the number of increments of the pointer. The recording velocity can be computed according to an expression (2) in the following.

[Recording velocity]=(Number of increments per second of a pointer of a buffer transmitting data to an encoder)×2352×75/1000 (KB/S)     (2)

Constants in the expression (2) represent the same as in the expression (1).

FIG. 4 is a diagram representing mode sense data on Mode Page 2Ah. The command used for transmitting the recording velocity information to the host may be formed according to vendor-specific specifications. However, using a standard command set enables a modification to be completed with minimum labor and code amount. Although there are a restricted number of commands acceptable during a recording, those commands include a mode sense command. Mode Page 2Ah present at a 0th byte of this command is a page representing a capability of the drive device, and has a format shown in FIG. 4. This format includes an item named "Current Write Speed Selected" at 20th to 21st bytes. This item indicates a recording velocity selected by the drive device aside from a recording velocity designated by the host. In the present invention, this item is used to notice a recording velocity during a recording. When the mode sense command is issued during a recording to make a request of Mode Page 2Ah, recording velocity information is set into this item, and is returned to the host.

The present invention is not limited to the specifically disclosed embodiments, and variations and modifications may be made without departing from the scope of the present invention.

The present application is based on Japanese priority application No. 2001-200228 filed on Jun. 29, 2001, the entire contents of which are hereby incorporated by reference.

What is claimed is:

1. An optical disc device recording data on an optical disc by projecting a laser beam on said optical disc such that a linear density of the data becomes substantially constant, the device comprising:

one of first recording means and second recording means for recording the data, the first recording means varying a recording velocity gradually, and the second recording means changing a recording velocity according as recording areas on said optical disc;

recording velocity detecting means for detecting said recording velocity during a recording performed by one of said first recording means and said second recording means; and recording velocity transmitting means for transmitting information concerning said recording velocity to a host, said recording velocity being detected by said recording velocity detecting means.

2. An optical disc device recording data on an optical disc by projecting a laser beam on said optical disc such that a linear density of the data becomes substantially constant, the device comprising:

velocity judging means for judging a recordable velocity for an optical recording medium inserted into said optical disc device;

velocity requesting means for receiving a command requesting a recording velocity from a host during a recording;

recording velocity detecting means for detecting said recording velocity during said recording; and recording velocity transmitting means for transmitting information concerning said recording velocity to said host, said recording velocity being detected by said recording velocity detecting means.

3. The optical disc device as claimed in claim 2, wherein said velocity changing means changes said recording velocity designated from said host to said recordable velocity judged by said velocity judging means when said recording velocity is equal to or higher than said recordable velocity.

4. The optical disc device as claimed in claim 1, wherein said recording velocity detecting means comprises:

synchronizing signal counting means for counting ATIP synchronizing signals included in a wobble signal, where said ATIP synchronizing signals represent absolute time information; and recording velocity calculating means for calculating said recording velocity from a number of said ATIP synchronizing signals counted within a predetermined time.

5. The optical disc device as claimed in claim 2, wherein said recording velocity detecting means comprises:

synchronizing signal counting means for counting ATIP synchronizing signals included in a wobble signal, where said ATIP synchronizing signals represent absolute time information; and recording velocity calculating means for calculating said recording velocity from a number of said ATIP synchronizing signals counted within a predetermined time.

6. The optical disc device as claimed in claim 1, wherein said recording velocity detecting means comprises:

buffer pointer monitoring means for monitoring a buffer pointer used for transmitting record data; and recording velocity computing means for computing said recording velocity from a value of said buffer pointer varied within a predetermined time.

7. The optical disc device as claimed in claim 2, wherein said recording velocity detecting means comprises:

buffer pointer monitoring means for monitoring a buffer pointer used for transmitting record data; and recording velocity computing means for computing said recording velocity from a value of said buffer pointer varied within a predetermined time.

8. The optical disc device as claimed in claim 1, wherein said recording velocity transmitting means transmits said information concerning said recording velocity to said host by using a mode sense command allowed to be issued during a recording.

9. The optical disc device as claimed in claim 2, wherein said recording velocity transmitting means transmits said information concerning said recording velocity to said host by using a mode sense command allowed to be issued during a recording.

* * * * *